United States Patent
Chana

[15] 3,703,228
[45] Nov. 21, 1972

[54] ACCUMULATOR FOR HYDRAULICALLY OPERATED FRICTION CLUTCH OR BRAKE UNIT

[72] Inventor: Howard E. Chana, Flint, Mich.
[73] Assignee: General Motors Corporation, Detroit, Mich.
[22] Filed: Sept. 17, 1970
[21] Appl. No.: 73,127

[52] U.S. Cl.................192/85 R, 138/31, 192/109 F
[51] Int. Cl..............................................F16d 25/00
[58] Field of Search.............192/109 F, 85 R; 138/31

[56] References Cited

UNITED STATES PATENTS

| | | |
|---|---|---|
| 3,540,558 | 11/1970 | Lamburn ...................192/85 R |
| 2,809,536 | 10/1957 | O'Malley.................192/109 F |
| 2,832,231 | 4/1958 | Edsall .......................192/85 R |
| 3,215,236 | 11/1965 | Pensa......................192/109 F |

*Primary Examiner*—Benjamin W. Wyche
*Assistant Examiner*—Randall Heald
*Attorney*—W. E. Finken, A. M. Heiter and C. R. White

[57] ABSTRACT

The accumulator, disposed in parallel relationship to the hydraulically operated servo for operating a friction clutch or brake unit, has a double rate accumulator spring which controls the stroke of the accumulator piston operating against the opposing force of a predetermined pressure equivalent to line pressure. With this construction the servo apply force is calibrated to produce smooth shifts in the transmission with the tailored and cushioned engagement of the friction unit.

2 Claims, 5 Drawing Figures

PATENTED NOV 21 1972 3,703,228
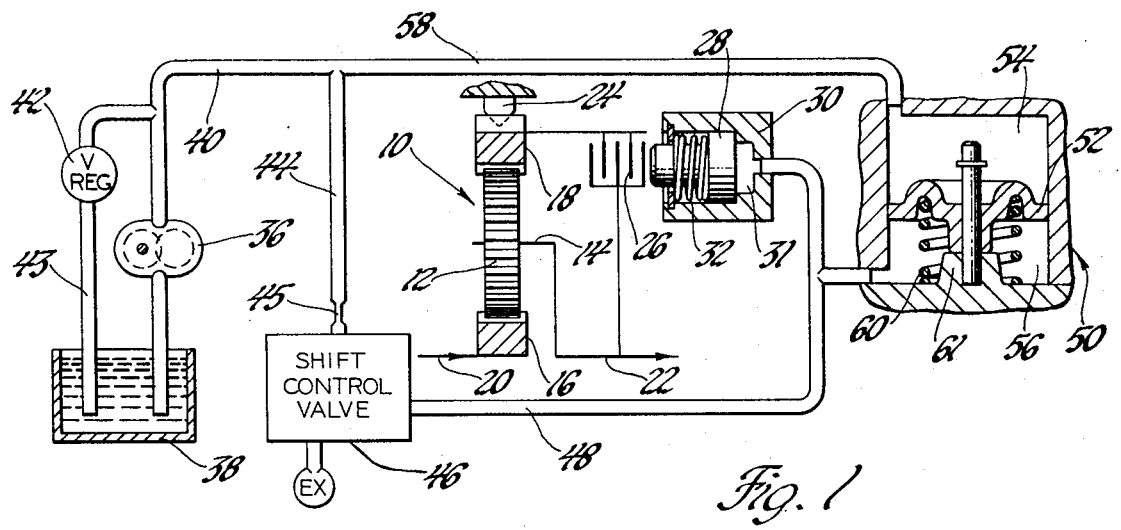
Fig. 1
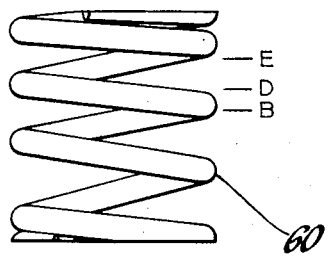
Fig. 2
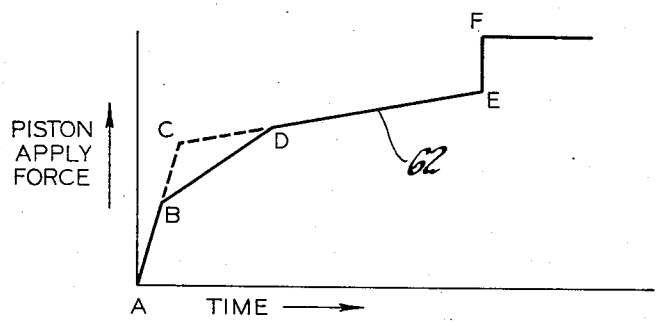
Fig. 3
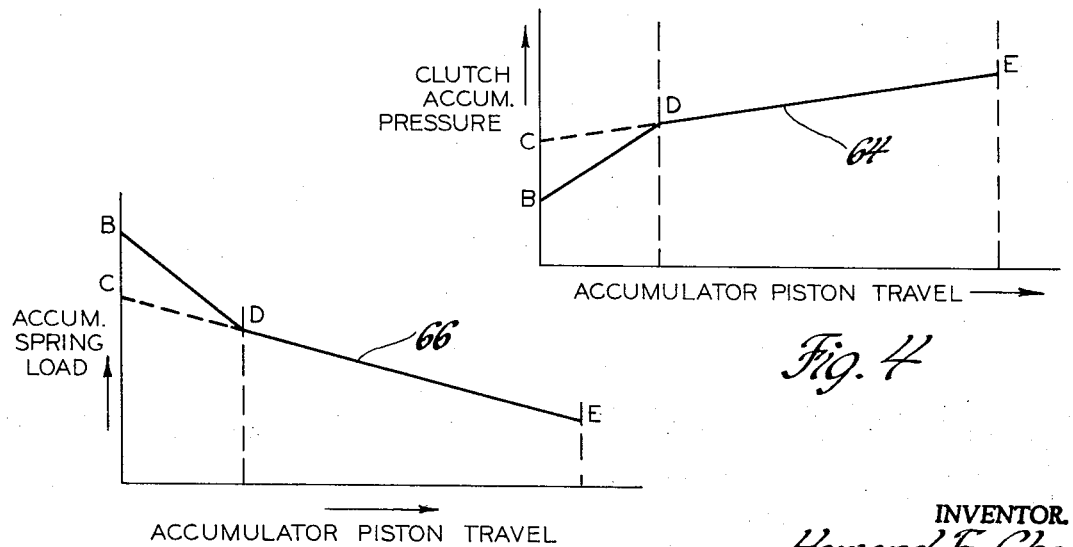
Fig. 4
Fig. 5
INVENTOR.
Howard E. Chana
BY
Charles R. White
ATTORNEY

ACCUMULATOR FOR HYDRAULICALLY OPERATED FRICTION CLUTCH OR BRAKE UNIT

This invention relates to hydraulic controls for friction clutch and brake units and more particularly to controls with an accumulator having a double rate accumulator spring for tailoring friction unit operation.

To produce the cushioned engagement of a friction drive establishing device for a speed change in transmission operation, cushion springs between the apply piston and friction device have been employed. In my prior U. S. Pat. No. 3,353,641 dated Nov. 21, 1967, an annular elastomeric cushion is disposed between a multi-plate friction device and a hydraulically operated apply piston to provide cushioned engagement of the friction plates. Coil and wave type springs have also been employed for this purpose. These constructions used with a conventional accumulator for the apply piston provide for the calibrated engagement of the friction device with smooth shifts for all throttle settings.

While such cushions provided the properly calibrated shifts for smooth shift transitions, additional parts and special designs were required which added to the complexity and costs of the transmission.

With this invention the prior art cushion springs are eliminated while providing the cushioned and timed engagement of the friction device. This construction employs an accumulator with a variable rate accumulator spring, preferably having a double rate, which tailors the operation of an associated apply piston or servo motor in engaging and disengaging a friction drive establishing device of a transmission. For engagement of the friction device the higher spring rate is effective to control the accumulator piston travel so that accumulator pressure sharply increases from an initial low pressure to taper the apply force of the apply piston as compared to a similar construction with a constant rate accumulator spring. As more spring coils become active, the spring rate is reduced so that the rate of rise of accumulator pressure is reduced with the accompanying gradual increase in the apply force exerted by the friction unit piston. After the accumulator is filled with pressure fluid, apply piston pressure rapidly increases to provide a no slip friction connection. With this tailored engagement of the friction unit rough shifts and shift shutter is substantially reduced or eliminated. By opening the servo apply line to an exhaust with an appropriate flow control restriction, the disengagement of the friction device is timed to provide for a smooth shift transition.

These and other advantages, features and objects of the invention will become more apparent from the following detailed description and drawing in which:

FIG. 1 is a diagram of a power transmission and power controls;

FIG. 2 is a side view of the double rate spring;

FIGS. 3, 4 and 5 are graphs which illustrate the operation of the servo and accumulator.

Referring to FIG. 1 there is a planetary gearset 10 which has a plurality of planet pinions 12 journaled on carrier 14 intermeshing with an input sun gear 16 and a reaction ring gear 18. A driving shaft 20 may be interconnected between the sun gear 16 and a prime mover, while the carrier 14 may be connected to an output or driven shaft 22. The driven shaft 22 is drivingly connected to the road wheels of a vehicle. When the reduced ratio drive is desired, a one-way brake is actuated to restrain rotation of ring gear 18 thereof to provide a reduced speed drive. If a direct drive is desired, a clutch 26 interposed between the driven shaft 22 and the ring gear 18 is engaged to prevent relative motion therebetween thus locking up the planetary gearset for unitary drive.

The clutch 26 is preferably of the multi-disc type engageable by a hydraulically operated servo or piston 28 mounted in housing 30 and forming an expansible hydraulic control chamber 31 therewith. Piston return springs 32 engage piston 28 and are operative to return the piston to a retracted position on the exhaust of operating fluid from the chamber 31 through a restricted exhaust passage.

In the preferred embodiment of this invention there are hydraulic controls which include a fluid pump 36 driven by the engine of the vehicle. This pump provides the fluid pressure supply for the controls and only operates when the engine is operating to draw fluid from sump 38 through an inlet passage and delivers the fluid under pressure to a line feed passage 40. The pressure in the line feed passage 40 is regulated by a conventional regulator valve 42 which operates to bypass excess fluid from the line feed passage 40 back to sump 38 via an exhaust passage 43. The line feed passage is hydraulically connected by passage 44 and flow control restriction 45 to a shift control valve 46 which in turn is hydraulically connected to the clutch apply chamber 31 by a fluid conducting passage 48.

For a calibrated engagement of the clutch 26 by the piston 28, there is provided a hydraulic accumulator 50 hydraulically connected to passage 48 in parallel with clutch piston chamber 31. This accumulator has a piston 52 forming upper and lower expansible chambers 54 and 56, with the former chamber being connected to the line feed passage 40 by a line 58. The lower chamber 56 has a variable rate accumulator spring 60 located therein with one end surrounding a stop 61 for the accumulator piston. The ends of the accumulator spring may be ground flat and square. One end of the spring is seated at the bottom of chamber 56 and the other end is in engagement with the underside of accumulator piston 52.

The variable rate spring 60 has coils wound from spring steel wire with a lead varied to provide a change in spring rate in two phases. As shown in FIG. 2, the spring in its free state has 4.75 total coils with the lead of the upper coils being small and much less than the lead of the lower coils. Between the installed position E and the more compressed position D almost three coils are active to provide a low spring rate, curve DE. When the coils having the smaller lead contact each other between positions D and B, fewer coils are active to provide a high spring rate curve DB. For example, when the illustrated spring is preloaded and then further compressed from E toward D in one phase of operation, 2.75 coils are active to provide a spring rate of 280 lbs./inch curve DE. As the load is increased compressing the spring from D to B, the coils having the smaller lead are in contact with each other and only the remaining 1.25 coils are active to provide a high spring rate curve DB of 670 lbs./inch.

Thus, this spring has coils having the lead varied at a different rate in at least two portions so some coils contact and are inactive to provide a change from one low spring rate curve DE to another higher spring rate curve DB to provide a changing spring rate curve BDE or 66.

FIG. 3 shows a full line curve 62 established by points ABDEF to illustrate the calibrated engagement of the friction clutch 26. At point A the shift control valve 46 has been actuated to effect an upshift of the transmission 10. This valve directs pressure fluid into passage 48 which flows into clutch piston chamber 31 and the lower chamber 56 of the accumulator 50. The segment of apply curve A-B illustrates the movement of piston 28 in deflecting the piston return springs 32. The friction plates of clutch 26 are not load carrying at this time and the accumulator piston is still in contact with the lower stop 61 being retained in this position by line pressure in chamber 54 acting on the upper side of piston 52.

After the return springs 32 have been deflected as represented by point B of curve 62 the pressure in the lower chamber 56 of the accumulator rapidly increases. The high rate of the accumulator spring plus the upward force exerted by the fluid pressure in chamber 56 strokes the accumulator piston upwardly to graduate or taper the increase in accumulator pressure and the accompanying increase in apply force exerted by apply piston 28. This action is illustrated by segment B-D of the accumulator pressure curve 64 of FIG. 4 and the corresponding segment B-D of the servo apply curve 62 of FIG. 3. The reduction of the accumulator spring load during this time is shown by segment B-D of the accumulator spring load curve 66 of FIG. 5.

With the increase in piston apply force tapered, the drive engagement of the friction of the clutch friction plates is properly cushioned to eliminate or substantially reduce rough shifting and shift shudder without auxiliary cushioning devices between clutch plates 26 and apply piston 28.

At point D on the three curves the spring has extended to a height D in FIG. 2 where the rate changes from a high rate spring to a low rate spring with more coils being active. With the decrease in spring rate the upward force on the accumulator piston 52 is decreased so that the increase in accumulator pressure is further graduated with an accompanying reduction in the increase in piston apply force. At point E the accumulator piston is fully stroked and the friction plates of clutch 26 are in full frictional drive engagement. The apply force of the piston then increases to point F to increase clutch capacity and to insure that there is no clutch plate slippage.

From the above it will be understood that the apply of the friction plates forming clutch 26 will be cushioned and timed so that a smooth shift transition will be achieved as the one-way brake is released. In the event that a down shift is desired the shift control valve exhausts the fluid from the apply chamber 31 and the accumulator chamber 56 through a flow restriction so that the servo apply force will generally follow at a lower level the curve represented in FIG. 3 to gradually release the clutch 26.

The dashed lined segments of the curves of FIGS. 3, 4 and 5 illustrate operation of the FIG. 1 construction with a single rate accumulator spring. As shown by segment AC in FIG. 3 a large apply force effects initial clutch engagement as the return springs are compressed. This produces rough shifts particularly with a light throttle opening which has been previously corrected by cushioning devices between clutch plates 26 and piston 28. The segment CE represents the gradual increase in servo apply force after initial clutch engagement.

Although the curves in FIGS. 3, 4 and 5 have been shown as connected straight lined segments for purposes of illustrating the operation of this invention, it will be appreciated that the zones of constant rate would be connected by a curved line to be representative of the operation.

Obviously, many modifications and variations are possible in light of the above description and drawing. Therefore, it is to be understood that within the scope of the appended claims the invention may be practiced otherwise than is specifically described.

What is claimed is:

1. A hydraulic control for a friction device selectively engageable to change the speed ratio of a transmission comprising a source of fluid pressure, a housing, a hydraulically operated control piston in said housing movable between first and second positions for respectively selectively engaging and releasing said friction device, said control piston cooperating with said housing to form an expansible and contractible control chamber therein for receiving pressurized fluid from said source, return spring means operatively connected to said piston for urging said piston from said first toward said second position, fluid conducting means hydraulically connecting said control chamber to said source, shift valve means hydraulically connected to said fluid conducting means operable to feed fluid from said source to said control chamber to cause said control piston to move toward said first position to effect the engagement of said friction device and operable to exhaust fluid from said control chamber so that said return spring moves said control piston to said second position to release said friction device, a fluid receiving accumulator for modulating the buildup of pressure in said control chamber, said accumulator having an accumulator piston movably mounted therein to provide first and second expansible and contractible chambers, fluid conducting means hydraulically connecting said first accumulator chamber in parallel with said control chamber of said control piston, fluid conducting means operatively connecting a second of said accumulator chambers to said source, a variable rate accumulator spring operatively disposed in a first of said accumulator chambers for continuously contacting said accumulator piston, said spring being a unitary helical spring having first and second coil means, said first coil means having a lead greater than said second coil means so that spring has a high spring rate for initially exerting a large load on said accumulator piston for initially stroking said accumulator piston in one direction in response to the supply of pressure fluid to said first chambers to increase the volume of said first chamber and thereby provide a controlled rate of increase of pressure in said control chamber and having a low spring rate for subsequently exerting a reduced load on said accumulator piston for further stroking said accumulator piston to further increase the volume of said first chamber and thereby reduce the rate of increase of pressure in said control chamber so that said accumulator effects the timed and cushioned engagement of said friction device by said control piston to change the speed ratio of said transmission.

2. A hydraulic control for a friction device selectively engageable to effect a speed ratio change in a transmission comprising a source of regulated fluid pressure, a housing, a control piston for effecting the engagement and disengagement of said friction device movably mounted in said housing and forming an expansible and contractible control chamber therein, a hydraulic accumulator, said accumulator having an accumulator piston mounted for movement between first and second positions therein and forming expansible and contractible first and second chambers therein, first fluid conducting means hydraulically connecting said first chamber of said accumulator in parallel with said control chamber and to hydraulically connect said last-mentioned chambers to said source, shift control valve means operatively connected in said first fluid conducting means to direct the supply of pressure fluid from said source to said last-mentioned chambers and to exhaust fluid from said last-mentioned chambers, second fluid conducting means hydraulically connecting said second chamber of said accumulator to said source for supplying a regulated pressure fluid to said second chamber, a unitary helical spring operatively disposed in said first chamber having one end seated directly on an end wall of said first chamber and the other end in direct contact with said accumulator piston, said spring having first and second coil means, said first coil means having a lead greater than the lead of said second coil means so that said spring first provides a high spring rate for initially exerting a large load on said accumulator piston when said accumulator piston is in said first position and stroking said accumulator piston from said first position toward said second position in response to the supply of pressure fluid to said first chamber to thereby increase the volume of said first chamber and provide a controlled rate of increase of pressure in said control chamber, said spring secondly providing a low spring rate for subsequently exerting a reduced load on said accumulator piston during expansion of said spring for stroking said accumulator piston to said second position to further increase the volume of said first chamber and thereby reduce the rate of increase in pressure in said control chamber so that said accumulator effects the timed and cushioned engagement of said friction device by said control piston.

* * * * *